(12) United States Patent
Yan

(10) Patent No.: US 9,187,582 B2
(45) Date of Patent: Nov. 17, 2015

(54) STABILIZED MULTI-VALENT ANIONIC POLYMERIZATION INITIATORS AND METHODS FOR PREPARING THE SAME

(71) Applicant: Bridgestone Corporation, Tokyo (JP)

(72) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/365,757

(22) PCT Filed: Dec. 17, 2012

(86) PCT No.: PCT/US2012/070039
§ 371 (c)(1),
(2) Date: Jun. 16, 2014

(87) PCT Pub. No.: WO2013/090885
PCT Pub. Date: Jun. 20, 2013

(65) Prior Publication Data
US 2014/0309390 A1    Oct. 16, 2014

Related U.S. Application Data

(60) Provisional application No. 61/576,043, filed on Dec. 15, 2011.

(51) Int. Cl.
| | | |
|---|---|---|
| C08F 2/00 | (2006.01) |
| C08F 4/00 | (2006.01) |
| C08F 12/34 | (2006.01) |
| C08F 236/00 | (2006.01) |
| C08F 214/06 | (2006.01) |
| C08F 212/06 | (2006.01) |
| C08F 210/00 | (2006.01) |
| C08G 61/00 | (2006.01) |
| C08G 73/00 | (2006.01) |
| C08G 73/06 | (2006.01) |
| C07D 245/00 | (2006.01) |
| C07D 225/02 | (2006.01) |
| C08F 4/48 | (2006.01) |
| C08K 5/00 | (2006.01) |
| C08F 36/04 | (2006.01) |
| C08C 19/44 | (2006.01) |
| C08F 212/08 | (2006.01) |

(52) U.S. Cl.
CPC ............... *C08F 4/488* (2013.01); *C08C 19/44* (2013.01); *C08F 36/04* (2013.01); *C08K 5/0091* (2013.01); *C08F 212/08* (2013.01)

(58) Field of Classification Search
CPC ....... C08K 5/0091; C08F 36/04; C08F 4/488; C08F 212/08; C08C 19/44
USPC ......... 526/217, 204, 236, 336, 340, 346, 347, 526/348; 528/396, 422, 423; 540/470, 474, 540/476; 546/184, 186, 246, 329; 564/453, 564/452, 454, 457, 461
See application file for complete search history.

(56) References Cited

U.S. PATENT DOCUMENTS

| | | |
|---|---|---|
| 4,935,471 A | 6/1990 | Halasa et al. |
| 5,149,457 A | 9/1992 | Smith |
| 5,196,138 A | 3/1993 | Smith, Jr. |
| 5,329,005 A | 7/1994 | Lawson et al. |
| 5,496,940 A | 3/1996 | Lawson et al. |
| 5,610,227 A | 3/1997 | Antkowiak et al. |
| 5,663,398 A | 9/1997 | Schwindeman et al. |
| 6,184,338 B1 | 2/2001 | Schwindeman et al. |
| 7,137,423 B2 | 11/2006 | Sandstrom et al. |
| 8,362,164 B2 | 1/2013 | Yan-Yong |
| 2002/0173607 A1 | 11/2002 | Brockmann |
| 2004/0235647 A1* | 11/2004 | Schwindeman et al. ...... 502/157 |
| 2006/0036050 A1 | 2/2006 | Antkowiak et al. |
| 2006/0264590 A1 | 11/2006 | Hogan et al. |
| 2012/0035336 A1* | 2/2012 | Yan .................................. 526/82 |

FOREIGN PATENT DOCUMENTS

WO    9618657 A1    6/1996

OTHER PUBLICATIONS

Adams, Florian, International Search Report with Written Opinion from PCT/US2012/070039, 10 pp. (Sep. 16, 2013).

* cited by examiner

*Primary Examiner* — William Cheung
(74) *Attorney, Agent, or Firm* — Meredith E. Hooker; Arthur M. Reginelli

(57) ABSTRACT

A stabilized initiator solution comprising a multi-valent lithiated containing initiator and an aliphatic or cycloaliphatic solvent.

21 Claims, No Drawings

STABILIZED MULTI-VALENT ANIONIC POLYMERIZATION INITIATORS AND METHODS FOR PREPARING THE SAME

This application is the U.S. National Stage of International Application Serial No. PCT/US2012/070039 filed Dec. 17, 2012, which claims the benefit of U.S. Provisional Application Ser. No. 61/576,043 filed Dec. 15, 2011, which is incorporated herein by reference.

FIELD OF THE INVENTION

Embodiments of the invention relate to stabilized solutions of multi-valent anionic polymerization initiators and methods for preparing these stabilized solutions. Other embodiments relate to polymerization methods employing stabilized solutions of multi-valent anionic polymerization initiators.

BACKGROUND OF THE INVENTION

Anionic polymerization techniques have been used to synthesize polymers that are useful in the manufacture of tire components. As is known in the art, certain initiators can be used that impart a functional group to the "head" of the polymer. And, certain terminating agents can be used that impart a functional group to the "tail" of the polymers. These functional groups are believed to have a beneficial impact on the performance of the polymers. For example, certain functional groups can yield lower hysteresis in reinforced rubber vulcanizates prepared using the functionalized polymers.

Telechelic linear polymers include a functional group at each terminus of the polymer (i.e., at the head and tail of the polymer). The polymers are believed to provide advantages deriving from the presence of a functional group at each terminus. These telechelic polymers have generally been synthesized by one of two routes. First, a functional initiator can be employed to initiate polymerization followed by the use of a functional terminator. While the ability to impart a functional group to the tail of a polymer through the use of a functional terminator is generally efficient, difficulties are often encountered when employing functional initiators and therefore lower yields of telechelic polymers are often observed when practicing this technique. A second technique includes the use of divalent initiators such as dilithio compounds. These initiators can produce diliving polymers that can be terminated with functional terminators to produce telechelic polymers. With regard to the latter, the ability to produce linear, high molecular weight polymer having narrow molecular weight distribution has proven to be problematic. It is believed that the lithium atoms of the dilithio initiators tend to aggregate and thereby have a deleterious impact on the polymerization. In order to alleviate these problems, U.S. Patent Publication No. 2009/0326176 proposes the use of multi-functional lithiated amine-containing initiators to produce diliving polymers.

While multi-functional lithiated amine-containing initiators have proven useful and overcome many of the problems associated with prior multi-valent lithiated initiators, there remains a desire for multi-valent lithiated initiators that are stable in aliphatic and/or cycloaliphatic solvents and remain stable during polymerizations including continuous polymerizations and polymerizations conducted at higher temperatures.

SUMMARY OF THE INVENTION

One or more embodiments of the present invention provide a stabilized initiator solution comprising: a chain-extended initiator defined by the Formula I

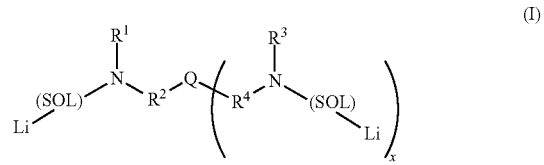

where SOL is a divalent solubilizing component, x is an integer of 1 or more, Q is (a) an element selected form the group consisting of O, S, N, P, and Si or (b) a multivalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group, or a chain-extended initiator defined by the Formula VI

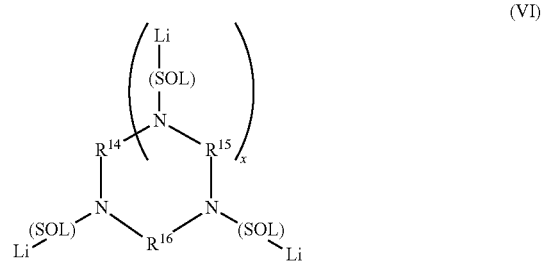

where each SOL is independently a divalent solubilizing component, x is an integer of 1 or more, and $R^{14}$, $R^{15}$, and $R^{16}$ are each independently a divalent organic group; and an aliphatic solvent, cycloaliphatic solvent, or a mixture thereof.

Other embodiments of the present invention provide a method for continuously manufacturing polydienes or polydiene copolymers, the method comprising: continuously charging conjugated diene monomer, optionally together with monomer copolymerizable therewith, to a reactor; and continuously charging a stabilized solution of a chain-extended initiator to the reactor, where the solution includes a chain-extended initiator defined by the Formula I

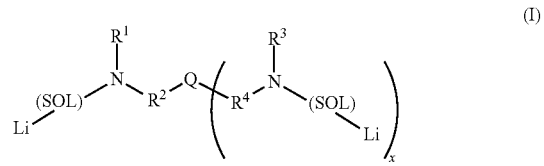

where SOL is a divalent solubilizing component, x is an integer of 1 or more, Q is (a) an element selected form the group consisting of O, S, N, P, and Si or (b) a multivalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group, or a chain-extended initiator defined by the Formula VI

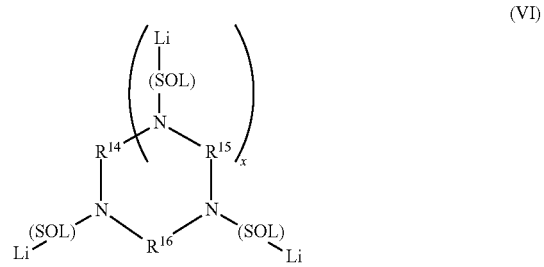

where each SOL is independently a divalent solubilizing component, x is an integer of 1 or more, and $R^{14}$, $R^{15}$, and $R^{16}$ are each independently a divalent organic group, and an aliphatic solvent, cycloaliphatic solvent, or a mixture thereof.

Still other embodiments of the present invention provide a method for continuously manufacturing polydienes or polydiene copolymers, the method comprising continuously charging conjugated diene monomer, optionally together with monomer copolymerizable therewith, to a reactor; and continuously charging a stabilized solution of a chain-extended initiator to the reactor, where the solution of a chain-extended initiator is prepared by first preparing a blend that includes a polyamine and conjugated diene monomer, and then subsequently introducing an organolithium compound to the blend to thereby form the chain-extended initiator within the solution.

DETAILED DESCRIPTION OF ILLUSTRATIVE EMBODIMENTS

Embodiments of the invention are based upon the discovery of a stabilized solution of a multi-valent lithiated amine-containing initiator. In one or more embodiments, the solution contains the initiator dissolved in an aliphatic and/or cycloaliphatic solvent at technologically useful concentrations. These stabilized solutions are advantageous because they can be used in continuous polymerization methods. Thus, while the prior art contemplates the use of multi-valent lithiated amine-containing initiators, the ability to use these initiators has been limited by the stability of the initiators in aliphatic and/or cycloaliphatic solvents. The shortcomings of the prior art have unexpectedly been overcome by providing stabilized initiator solutions as described herein.

Stabilized Solutions

In one or more embodiments, the stabilized solutions of multi-valent lithiated amine-containing initiators, which may be referred to herein as stabilized initiator solutions, include a chain-extended multi-valent lithiated amine-containing initiator dissolved in an aliphatic and/or cycloaliphatic solvent. As used herein, reference to the term dissolved in an aliphatic and/or cycloaliphatic solvent refers to a solution that includes no appreciable solids (i.e., no visible precipitate) when viewed under white light at ambient conditions under no magnification.

In one or more embodiments, the initiator solutions of this invention may include at least 0.6 molar initiator solutions including up to about 30 volume percent aliphatic or cycloaliphatic solvent, where the initiator compound is soluble and stable at room temperature and standard pressure for 24 hours. In other embodiments, initiator solutions may include at least 0.3 molar initiator solutions including up to about 65 volume percent, and in other embodiments up to about 70 volume percent, aliphatic or cycloaliphatic solvent, where the initiator compound is soluble and stable at room temperature and standard pressure for 24 hours.

In one or more embodiments, the chain-extended multi-valent lithiated amine-containing initiators, which may simply be referred to as chain-extended initiators, may be defined by the formula I:

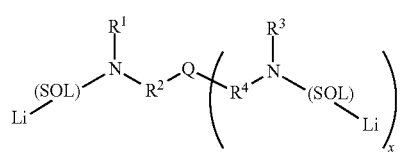

(I)

where SOL is a divalent solubilizing component, x is an integer of 1 or more, Q is (a) an element selected form the group consisting of O, S, N, P, and Si or (b) a multivalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group.

In one or more embodiments, x is an integer from 1 to 6, in other embodiments from 1 to 4, and in other embodiments from 1 to 2. In particular embodiments, x is 1. In other embodiments, x is 2. In yet other embodiments, x is 3. In those embodiments where Q is an element selected from the group consisting of O, S, N, P, or Si, x may be an integer from 1 to 3. In those embodiments where Q is a multivalent organic group, x may be an integer from 1 to 20, in other embodiments from 1 to 10, in other embodiments from 1 to 3, and in other embodiments from 1 to 2. In particular embodiments, Q is a multivalent organic group and x is 1.

In one or more embodiments, the monovalent organic groups may be hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as a hydrocarbyl, hydrocarbyloxy, or silyl group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms without active or labile hydrogen atoms associated therewith.

In one or more embodiments, the multivalent organic group may include, for example, divalent organic groups, trivalent organic groups, tetravalent organic groups, and larger molecular species, such as oligomeric and polymeric species, having a valence of 5 or more. In one or more embodiments, the divalent organic groups may include hydrocarbylene groups or substituted hydrocarbylene groups such as, but not limited to, alkylene, cycloalkylene, alkenylene, cycloalkenylene, alkynylene, cycloalkynylene, or arylene groups. Substituted hydrocarbylene groups include hydrocarbylene groups in which one or more hydrogen atoms have been replaced by a substituent such as an alkyl group. In one or more embodiments, these groups may include from one, or the appropriate minimum number of carbon atoms to form the group, to about 20 carbon atoms. These groups may also contain one or more heteroatoms such as, but not limited to, nitrogen, oxygen, boron, silicon, sulfur, tin, and phosphorus atoms.

In one or more embodiments, SOL is a divalent oligomer including from 3 to about 300 mer units. In other embodiments, SOL is a divalent oligomer including from 3 to 100 or in other embodiments from 3 to 20 mer units. In one or more embodiments, the mer units of SOL derive from the polymerization of conjugated diene monomer optionally together with monomer copolymerizable with the conjugated diene monomer. Examples of conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, α-methylstyrene, and vinylnaphthalene.

For example, the chain-extended initiators of these embodiments may be defined by the formulas II, III, or IV:

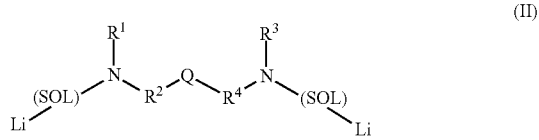

(II)

where each SOL is independently a divalent solubilizing component, Q is (a) an element selected form the group consisting of O, S, N, P, and Si or (b) a divalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group; or

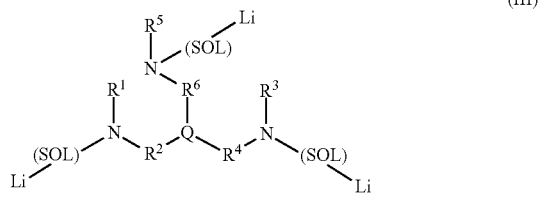

(III)

where each SOL is independently a divalent solubilizing component, Q is (a) an element selected form the group consisting of N, P, and Si or (b) a trivalent organic group, and $R^1$, $R^2$, $R^3$, $R^4$, $R^5$ and $R^6$ are each independently a monovalent organic group, or where $R^1$ joins with $R^2$ to form a trivalent organic group, and/or $R^3$ joins with $R^4$ to form a trivalent organic group, and/or $R^5$ joins with $R^6$ to form a trivalent organic group; or

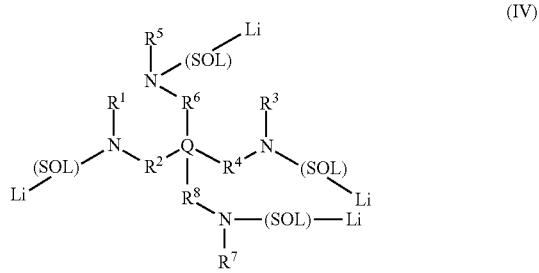

(IV)

where each SOL is independently a divalent solubilizing component, Q is a silicon or a tetravalent organic group, and $R^1$, $R^2$, $R^3$, $R^4$, $R^5$, $R^6$, $R^7$, and $R^8$ are each independently a monovalent organic group, or where $R^1$ joins with $R^2$ to form a trivalent organic group, and/or $R^3$ joins with $R^4$ to form a trivalent organic group, and/or $R^5$ joins with $R^6$ to form a trivalent organic group, and/or $R^7$ joins with $R^8$ to form a trivalent organic group.

In one or more embodiments, where $R^1$ joins with $R^2$, and $R^3$ joins with $R^4$, to form a trivalent organic group, the chain-extended initiators may be defined by the formula V:

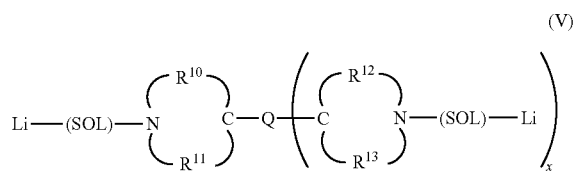

(V)

where each SOL is independently a divalent solubilizing component, x is an integer of 1 or more, Q is (a) an element selected form the group consisting of O, S, N, P, and Si or (b) a multivalent organic group, and $R^{10}$, $R^{11}$, $R^{12}$, and $R^{13}$ are each independently a divalent organic group.

In yet other embodiments, the chain-extended initiators may be defined by the formula VI:

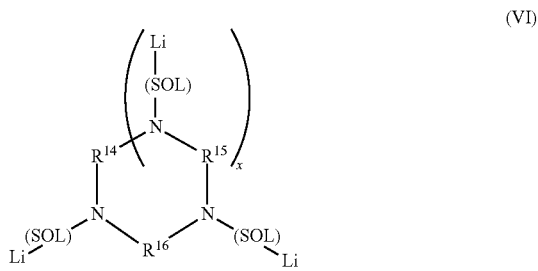

(VI)

where each SOL is independently a divalent solubilizing component, x is an integer of 1 or more, and $R^{14}$, $R^{15}$, and $R^{16}$ are each independently a divalent organic group. In one or more embodiments, $R^{14}$, $R^{15}$, and $R^{16}$ are each independently alkylene groups containing from 2 to 20 carbon atoms.

In one or more embodiments, the stabilized initiator solutions may include at least 0.01, in other embodiments at least 0.05, and in other embodiments at least 0.1 moles of chain-extended initiator per liter of aliphatic and/or cycloaliphatic solvent. In these or other embodiments, the stabilized initiator solutions may include from about 0.01 to about 1, in other embodiments from about 0.05 to about 0.5, and in other embodiments from about 0.1 to about 0.3 moles of chain-extended initiator per liter of aliphatic and/or cycloaliphatic solvent.

Exemplary aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and mixtures of two or more thereof. And, non-limiting examples of cycloaliphatic hydrocarbons include cyclopentane, cyclohexane, methylcyclopentane, methylcyclohexane and mixtures of two or more thereof. Mixtures of aliphatic and cylcoaliphatic hydrocarbons may also be used.

In one or more embodiments, the solvent employed in the initiator solutions may also include an ether solvent. Useful ethers include tetrahydrofuran (THF), 1,2-dimethoxyethene, 1,6-dimethoxyhexane, 1,3-dioxane, 1,4-dioxane, anisole, ethoxybenzene, and mixtures thereof. In other embodiments, the initiator solution is devoid or substantially devoid of ether solvent.

Preparation of Stabilized Solution

In one or more embodiments, the stabilized initiator solutions are prepared by first introducing a polyamine and conjugated diene monomer to form a blend within an aliphatic and/or cycloaliphatic solvent that may optionally include an ether. In certain embodiments, the blend may also include monomer copolymerizable with the conjugated diene monomer (e.g., vinyl aromatic monomer) and/or a vinyl modifier. Once the blend is formed, an organolithium compound is introduced to the blend. The introduction of the organolithium compound initiates a reaction that forms the chain-extended initiator. In certain embodiments, a vinyl modifier may be introduced with the organolithium compound. It is believed that combination of polyamine, organolithium compound, and monomer form the chain-extended initiators of this invention.

The polyamine that may be employed in practice of this invention includes those disclosed in U.S. Publication No. 2009/0326176, which is incorporated herein by reference. In certain embodiments, the polyamine may be defined by the formula VII:

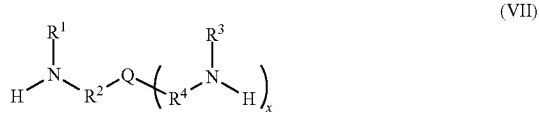

(VII)

where x is an integer of 1 or more, Q is (a) an element selected form the group consisting of O, S, N, P, and Si or (b) a multivalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group.

In other embodiments, the polyamine may be defined by the formula VIII:

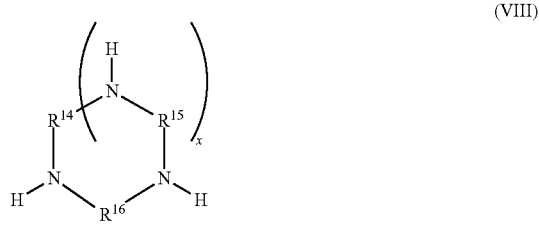

(VIII)

where x is an integer of 1 or more, and $R^{14}$, $R^{15}$, and $R^{16}$ are each independently a divalent organic group. In one or more embodiments, $R^{14}$, $R^{15}$, and $R^{16}$ are each independently alkylene groups containing from 3 to 20 carbon atoms.

Exemplary polyamines include, but are not limited to, 4,4'-trimethylenedipiperidine, N,N'-diethyl-1,3-propanediamine, N,N'-diisopropyl-1,3-propanediamine, N,N'-diethyl-2-butene-1,4-diamine, tris[2-(methylamino)ethyl]amine, tris[2-(isopropylamino)ethyl]amine, 1,5,9-triazacyclododecane, 1,4,7,10-tetraazacyclododecane, 1,4,8,11-tetraazacyclotetradecane, 1,4,8,12-tetraazacyclopentadecane, and 1,4,7,10,13,16-hexaazacyclooctadecane.

In one or more embodiments, a vinyl modifier includes those compounds that, when present during polymerization of conjugated diene monomer, impact the vinyl content of the polydiene polymers. Vinyl modifiers may also be referred to as polar coordinators. Exemplary vinyl modifiers include ethers or amines.

Compounds useful as polar coordinators (as well as randomizers) include those having an oxygen or nitrogen heteroatom and a non-bonded pair of electrons. Examples include linear and cyclic oligomeric oxolanyl alkanes; dialkyl ethers of mono and oligo alkylene glycols (also known as glyme ethers); "crown" ethers; tertiary amines; linear THF oligomers; and the like. Linear and cyclic oligomeric oxolanyl alkanes are described in U.S. Pat. No. 4,429,091, which is incorporated herein by reference. Specific examples of compounds useful as randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N-N'-dimethylpiperazine, diazabicyclooctane, dimethyl ether, diethyl ether, tri-n-butylamine, and mixtures thereof. In other embodiments, potassium alkoxides can be used to randomize the styrene distribution.

In one or more embodiments, the organolithium compound may be defined by the formula R—Li, where R is a monovalent organic group. As mentioned above, monovalent organic groups may include hydrocarbyl groups such as alkyl groups. Specific non-limiting examples of organolithium compounds useful in practice of the present invention include n-propyllithium, n-butyllithium, isopropyl lithium, and isobutyl lithium.

In one or more embodiments, the solvent in which the blend of polyamine and monomer is prepared includes an aliphatic solvent, a cycloaliphatic solvent, optionally an ether, or a combination of two or more thereof. In one or more embodiments, the amount of polyamine within the blend may be represented with respect to the amount of lithium that will subsequently be charged to the system. In this respect, the amount may be represented as a molar ratio of the moles of amine within the polyamine (i.e., equivalents of amine) to the moles of lithium subsequently charged to the system (N/Li) of from about 0.5:1 to about 1.5:1, in other embodiments from about 0.7:1 to about 1.3:1, and in other embodiments from about 0.9:1 to about 1.1:1. For example, where a diamine is employed, the molar ratio of the diamine compound to a monolithiated compound that will be charged to the system may be from about 0.25:1 to about 0.75:1, in other embodiments from about 0.35:1 to about 0.65:1, and in other embodiments from about 1.45:1 to about 0.55:1.

In one or more embodiments, the amount of monomer within the blend may likewise be described with respect to the amount of lithium (i.e., equivalents of lithium) subsequently added to the system. In other words, the amount of monomer may be defined as a ratio of moles of monomer to moles of lithium atoms (monomer/Li) subsequently charged to the system. In one or more embodiments, the ratio (monomer/Li) may be from about 2:1 to about 100:1, in other embodiments from about 3:1 to about 50:1, and in other embodiments from about 4:1 to about 12:1.

In one or more embodiments, the amount of vinyl modifier, which may be added to the blend prior to or together with the organolithium compound, may be described with respect to the amount of lithium (i.e., equivalents of lithium) subsequently added to the system. In other words, the amount of vinyl modifier may be defined as a ratio of vinyl modifier to lithium atoms (modifier/Li). In one or more embodiments, the ratio of modifier/Li may be from 0.01:1 to 1.5:1, in other embodiments from 0.15:1 to 1:1, and in other embodiments from 0.2:1 to 0.8:1.

Polymerization Using Stabilized Solution

The stabilized initiator solution may be employed in the polymerization of conjugated diene monomer, optionally together with monomer copolymerizable therewith. The stability of the initiator solution advantageously allows for the preformation of the initiator solution, optionally followed by temporary storage, and then introduction of the initiator solution to the polymerization system. The ability to preform the initiator solution is particularly advantageous when using the initiator in a continuous polymerization process.

The monomer solution to which the preformed initiator solution (i.e., the stabilized initiator solution) is introduced may include conjugated diene monomer, optionally with monomer copolymerizable therewith (e.g., vinyl aromatic monomer), and solvent. In one or more embodiments, the monomer is dissolved or at least partially dissolved or suspended in the solvent. The solvent may include aliphatic solvent, cycloaliphatic solvent, optionally an ether, or a mixture of two or more thereof.

In one or more embodiments, the amount of monomer within the solvent (i.e., polymerization system), which may be referred to as the monomer to be polymerized, may be from about 5 to about 25 weight percent, in other embodiments from about 8 to about 22 weight percent, and in other embodiments from about 10 to about 20 weight percent based on the total weight of the monomer and solvent combined.

The stabilized initiator solution can be charged to the monomer to be polymerized using a variety of techniques. In one or more embodiments, the stabilized initiator solution is charged continuously to a continuously stirred reactor that also receives a continuous feed of monomer to be polymerized, optionally together with additional solvent and vinyl modifier. In one or more embodiments, conditions within a continuous polymerization system can include temperatures in excess of 25° C., in other embodiments in excess of 30° C., in other embodiments in excess of 45° C., and in other embodiments in excess of 55° C.

In the presence of the chain-extended initiator, the monomer to be polymerized is polymerized by what is believed to be a living polymerization. Anionically-polymerized polymers are prepared by anionic polymerization, wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce reactive polymers (e.g. living polymers) that, prior to quenching, are capable of reacting with additional monomers for further chain growth or reacting with certain functionalizing agents to give functionalized polymers. As those skilled in the art appreciate, these reactive polymers include reactive chain ends, which are believed to be ionic, at which a reaction between the functionalizing agent and the polymer takes place.

When preparing elastomeric copolymers, such as those containing mer units deriving from conjugated diene monomers and vinyl-substituted aromatic monomers, the conjugated diene monomers and vinyl-substituted aromatic monomers may be used at a ratio of 95:5 to 50:50, or in other embodiments, 95:5 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator.

Production of the reactive polymer can be accomplished by polymerizing conjugated diene monomer, optionally together with monomer copolymerizable with conjugated diene monomer, in the presence of an effective amount of the initiator. The introduction of the initiator, the conjugated diene monomer, optionally the comonomer, and any solvent if employed forms a polymerization mixture in which the reactive polymer is formed. The amount of the initiator to be employed may depend on the interplay of various factors such as the type of initiator employed, the purity of the ingredients, the polymerization temperature, the polymerization rate and conversion desired, the molecular weight desired, and many other factors.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

The polymerization may be conducted in any conventional polymerization vessels known in the art. In one or more embodiments, solution polymerization can be conducted in a conventional stirred-tank reactor.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In any event, this reaction produces a reactive polymer having two or more reactive or living ends. In one or more embodiments, at least about 30% of the polymer molecules contain two or more living ends, in other embodiments at least about 50% of the polymer molecules contain two or more living ends, and in other embodiments at least about 80% contain two or more living ends. In one or more embodiments, these living end characteristics are achieved when the present invention is practiced using continuous polymerization techniques.

The living polymer can be protonated or subsequently functionalized or coupled. Protonation can occur by the addition of any compound that can donate a proton to the living end. Examples include water, isopropyl alcohol, and methyl alcohol.

In one or more embodiments, the living polymer can be terminated with a compound that will impart a functional group to the terminus of the polymer. Useful functionalizing agents include those conventionally employed in the art. Types of compounds that have been used to end-functionalize living polymers include carbon dioxide, benzophenones, benzaldehydes, imidazolidones, pyrrolidinones, carbodiimides, ureas, isocyanates, and Schiff bases including those disclosed in U.S. Pat. Nos. 3,109,871, 3,135,716, 5,332,810, 5,109,907, 5,210,145, 5,227,431, 5,329,005, 5,935,893, which are incorporated herein by reference. Specific examples include trialkyltin halides such as triisobutyltin chloride, as disclosed in U.S. Pat. Nos. 4,519,431, 4,540,744, 4,603,722, 5,248,722, 5,349,024, 5,502,129, and 5,877,336, which are incorporated herein by reference. Other examples include cyclic amino compounds such as hexamethyleneimine alkyl chloride, as disclosed in U.S. Pat. Nos. 5,786,441, 5,916,976 and 5,552,473, which are incorporated herein by reference. Other examples include N-substituted aminoketones, N-substituted thioaminoketones, N-substituted aminoaldehydes, and N-substituted thioaminoaldehydes, including N-methyl-2-pyrrolidone or dimethylimidazolidinone (i.e., 1,3-dimethylethyleneurea) as disclosed in U.S. Pat. Nos. 4,677,165, 5,219,942, 5,902,856, 4,616,069, 4,929,679, 5,115,035, and 6,359,167, which are incorporated herein by reference. Additional examples include cyclic sulfur-containing or oxygen containing azaheterocycles such as disclosed in WO 2004/020475, U.S. Publication No. 2006/0178467 and U.S. Pat. No. 6,596,798, which are incorporated herein by reference. Other examples include boron-containing terminators such as disclosed in U.S. Pat. No. 7,598,322, which is incorporated herein by reference. Still other examples include cyclic siloxanes such as hexamethylcyclotrisiloxane, including those disclosed in U.S. Ser. No. 60/622,188, which is incorporated herein by reference. Further, other examples include α-halo-ω-amino alkanes, such as 1-(3-bromopropyl)-2,2,5,5-tetramethyl-1-aza-2,5-disilacyclopentane, including those disclosed in U.S. Ser. Nos. 60/624,347 and 60/643,653, which are incorporated herein by reference. Yet other examples include silane-type terminators, such as 3-(1,3-dimethylbutylidene)aminopropyl-triethoxysilane. Still other examples include benzaldehyde-type terminators, such as 3,4-di(tert-butyldimethylsiloxy)benzaldehyde, which are disclosed in U.S. Publication No. 2010/0286348, which is incorporated herein by reference.

In one or more embodiments, the living polymer can be coupled to link two or more living polymer chains together. In certain embodiments, the living polymer can be treated with both coupling and functionalizing agents, which serve to couple some chains and functionalize other chains. The combination of coupling agent and functionalizing agent can be used at various molar ratios. Although the terms coupling and functionalizing agents have been employed in this specification, those skilled in the art appreciate that certain compounds may serve both functions. That is, certain compounds may both couple and provide the polymer chains with a functional group. Those skilled in the art also appreciate that the ability to couple polymer chains may depend upon the amount of coupling agent reacted with the polymer chains. For example, advantageous coupling may be achieved where the coupling agent is added in a one to one ratio between the equivalents of lithium on the initiator and equivalents of leaving groups (e.g., halogen atoms) on the coupling agent.

Exemplary coupling agents include metal halides, metalloid halides, alkoxysilanes, and alkoxystannanes.

In one or more embodiments, useful metal halides or metalloid halides may be selected from the group comprising compounds expressed by the formula (1) $R^1{}_nM^1X_{4-n}$, the formula (2) $M^1X_4$, and the formula (3) $M^2X_3$, where $R^1$ is the same or different and represents a monovalent organic group with carbon number of 1 to about 20, $M^1$ in the formulas (1) and (2) represents a tin atom, silicon atom, or germanium atom, $M^2$ represents a phosphorous atom, X represents a halogen atom, and n represents an integer of 0-3.

Exemplary compounds expressed by the formula (1) include halogenated organic metal compounds, and the compounds expressed by the formulas (2) and (3) include halogenated metal compounds.

In the case where $M^1$ represents a tin atom, the compounds expressed by the formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by formula (2).

In the case where $M^1$ represents a silicon atom, the compounds expressed by the formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the formula (2). In the case where $M^1$ represents a germanium atom, the compounds expressed by the formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the formula (2). Phosphorous trichloride, phosphorous tribromide and the like can be exemplified as the compounds expressed by the formula (3). In one or more embodiments, mixtures of metal halides and/or metalloid halides can be used.

In one or more embodiments, useful alkoxysilanes or alkoxystannanes may be selected from the group comprising compounds expressed by the formula (1) $R^1{}_nM^1(OR)_{4-n}$, where $R^1$ is the same or different and represents a monovalent organic group with carbon number of 1 to about 20, $M^1$ represents a tin atom, silicon atom, or germanium atom, OR represents an alkoxy group where R represents a monovalent organic group, and n represents an integer of 0-3.

Exemplary compounds expressed by the formula (4) include tetraethyl orthosilicate, tetramethyl orthosilicate, tetrapropyl orthosilicate, tetraethoxy tin, tetramethoxy tin, and tetrapropoxy tin.

In one embodiment, the functionalizing agent may be added to the living polymer cement (i.e., polymer and solvent) once a peak polymerization temperature, which is indicative of nearly complete monomer conversion, is observed. Because live ends may self-terminate, the functionalizing agent may be added within about 25 to 35 minutes of the peak polymerization temperature.

In one or more embodiments, the amount of the functionalizing agent employed can be described with reference to the amount of metal cation associated with the initiator. For example, the molar ratio of the functionalizing agent to the lithium metal may be from about 0.1:1 to about 2:1, in other embodiments from about 0.3:1 to about 2:1, in other embodiments from about 0.6:1 to about 1.5:1, and in other embodiments from 0.8:1 to about 1.2:1.

In one or more embodiments, the functionalizing agent may be introduced to the polymerization mixture as a solution within an organic solvent. Suitable solvents include those described herein including those used to prepare the polymerization mixture. In certain embodiments, the same solvent employed to prepare the polymerization mixture can be used to prepare the solution of the functionalizing agent. Advantageously, one or more functionalizing agent of the present invention form technologically useful and stable solutions in aliphatic solvents such as hexane, cyclohexane, and/or derivatives thereof. In one or more embodiments, the concentration of the functionalizing agent in aliphatic solvent may be at least 0.05 molar, in other embodiments at least 0.5 molar, in other embodiments at least 1 molar and in other embodiments from about 0.5 to about 3 molar.

In one or more embodiments, the functionalizing agent can be reacted with the reactive polymer after a desired monomer conversion is achieved but before the polymerization mixture is quenched by a quenching agent. In one or more embodiments, the reaction between the functionalizing agent and the reactive polymer may take place within 180 minutes, in other embodiments within 60 minutes, in other embodiments within 30 minutes, in other embodiments within 5 minutes, and in other embodiments within one minute after the peak polymerization temperature is reached. In one or more embodiments, the reaction between the functionalizing agent and the reactive polymer can occur once the peak polymerization temperature is reached. In other embodiments, the reaction between the functionalizing agent and the reactive polymer can occur after the reactive polymer has been stored. In one or more embodiments, the storage of the reactive polymer occurs at room temperature or below under an inert atmosphere. In one or more embodiments, the reaction between the functionalizing agent and the reactive polymer may take place at a temperature from about 10° C. to about 150° C., and in other embodiments from about 20° C. to about 100° C. In one or more embodiments, the reaction between the functionalizing agent and the living polymer takes place at temperatures in excess of 25° C., in other embodiments in excess of 35° C., in other embodiments in excess of 45° C., and in other embodiments in excess of 55° C. The time required for completing the reaction between the functionalizing agent and the reactive polymer depends on various factors such as the type and amount of the catalyst or initiator used to prepare the reactive polymer, the type and amount of the functionalizing agent, as well as the temperature at which the functionalization reaction is conducted. In one or more embodiments, the reaction between the functionalizing agent and the reactive polymer can be conducted for about 10 to 60 minutes.

Quenching

In one or more embodiments, after the reaction between the reactive polymer and the functionalizing agent has been accomplished or completed, a quenching agent can be added to the polymerization mixture—in order to inactivate any residual reactive polymer chains and the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product.

In one or more embodiments, after the introduction of the functionalizing agent to the reactive polymer, optionally after the addition of a quenching agent and/or antioxidant, an optionally after recovery or isolation of the functionalized polymer, a condensation accelerator can be added to the polymerization mixture. Useful condensation accelerators include tin and/or titanium carboxylates and tin and/or titanium alkoxides. One specific example is titanium 2-ethylhexyl oxide. Useful condensation catalysts and their use are disclosed in U.S. Publication No. 2005/0159554A1, which is incorporated herein by reference.

Polymer Isolation

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drying the polymer cement on a drum dryer. The content of the volatile substances in the dried polymer can be below 1%, and in other embodiments below 0.5% by weight of the polymer.

Polymer Product

While the functionalizing agent and reactive polymer are believed to react to produce novel functionalized polymers, the exact chemical structure of the functionalized polymer produced in every embodiment is not known with any great degree of certainty, particularly as the structure relates to the residue imparted to the polymer chain end by the functionalizing agent. Indeed, it is speculated that the structure of the functionalized polymer may depend upon various factors such as the conditions employed to prepare the reactive polymer (e.g., the type and amount of the initiator) and the conditions employed to react the functionalizing agent with the reactive polymer. In particular embodiments, practice of the present invention results in a telechelic polyer In one or more embodiments, the polymer chain ($\pi$) of the functionalized polymer contains unsaturation. In these or other embodiments, the polymer chain is vulcanizable. In particular embodiments, where the reactive polymer is prepared by employing a functional anionic initiator, the head of the polymer chain ($\pi$) includes a functional group that is the residue of the functional initiator.

The polymer chain can have a glass transition temperature ($T_g$) that is less than 0° C., in other embodiments less than −20° C., and in other embodiments less than −30° C. In one embodiment, the polymer chain may exhibit a single glass transition temperature.

In one or more embodiments, the polymer chain ($\pi$) prepared according to this invention may be medium or low cis polydienes (or polydiene copolymers) including those prepared by anionic polymerization techniques. These polydienes can have a cis content of from about 10% to 60%, in other embodiments from about 15% to 55%, and in other embodiments from about 20% to about 50%, where the percentages are based upon the number of diene mer units in the cis configuration versus the total number of diene mer units. These polydienes may also have a 1,2-linkage content (i.e. vinyl content) from about 10% to about 90%, in other embodiments from about 10% to about 60%, in other embodiments from about 15% to about 50%, and in other embodiments from about 20% to about 45%, where the percentages are based upon the number of diene mer units in the vinyl configuration versus the total number of diene mer units. The balance of the diene units may be in the trans-1,4-linkage configuration.

In particular embodiments, the polymer chain ($\pi$) may be a copolymer of butadiene, styrene, and optionally isoprene. These may include random copolymers. In other embodiments, the polymers are block copolymers of polybutadiene, polystyrene, and optionally polyisoprene. In particular embodiments, the polymers are hydrogenated or partially hydrogenated. In one or more embodiments, the polymer chain ($\pi$) is a copolymer of styrene and conjugated diene where the molar ratio of styrene mer units to conjugated diene mer units is from about 1:1 to about 0.05:1, in other embodiments from about 0.7:1 to about 0.1:1, and in other embodiments from about 0.5:1 to about 0.2:1.

In one or more embodiments, the polymer chain π is an anionically-polymerized polymer selected from the group consisting of polybutadiene, polyisoprene, poly(styrene-co-butadiene), poly(styrene-co-butadiene-co-isoprene), poly(isoprene-co-styrene), and poly(butadiene-co-isoprene). The number average molecular weight ($M_n$) of these polymers may be from about 1,000 to about 1,000,000, in other embodiments from about 5,000 to about 1,000,000, in other embodiments from about 50,000 to about 500,000, and in other embodiments from about 100,000 to about 300,000, as determined by using gel permeation chromatography (GPC) calibrated with polystyrene standards and Mark-Houwink constants for the polymer in question. The polydispersity ($M_w/M_n$) of these polymers may be from about 1.0 to about 3.0, and in other embodiments from about 1.1 to about 2.0.

In one or more embodiments, the polymer product produced according to aspects of the present invention, including those aspects where the polymer is produced by continuous polymerization techniques, may be characterized by a telechelic functionality of at least 30%, in other embodiments at least 40%, in other embodiments at least 50%, in other embodiments at least 70%, and in other embodiments at least 80%.

Use in Tires

The functionalized polymers of this invention are particularly useful in preparing tire components. In particular embodiments, these tire components include silica filler. These tire components can be prepared by using the functionalized polymers alone or together with other rubbery polymers (i.e., polymers that can be vulcanized to form compositions possessing elastomeric properties). Other rubbery polymers that may be used include natural and synthetic elastomers. The synthetic elastomers typically derive from the polymerization of conjugated diene monomers. These conjugated diene monomers may be copolymerized with other monomers such as vinyl-substituted aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the functional polymers are employed in tread and sidewall formulations. In one or more embodiments, these tread formulations may include from about 10% to about 100% by weight, in other embodiments from about 35% to about 90% by weight, and in other embodiments from about 50% to 80% by weight of the functionalized polymer based on the total weight of the rubber within the formulation.

In one or more embodiments, the vulcanizable rubber composition may be prepared by forming an initial masterbatch that includes the rubber component and filler (the rubber component optionally including the functionalized polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mixing stage, which preferably does not initiate the vulcanization process. For example, the vulcanizing agents may be introduced at a temperature less than 140° C., in other embodiments less than 120° C., and in other embodiments less than 110° C. Optionally, additional mixing stages, sometimes called remills, can be employed between the masterbatch mixing stage and the final mixing stage. Various ingredients including the functionalized polymer of this invention can be added during these remills. Rubber compounding techniques and the additives employed therein are generally known as disclosed in The Compounding and Vulcanization of Rubber, in Rubber Technology (2" Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

To two gallons $N_2$ purged reactor equipped with a stirrer was added 1.708 kg of hexane, 0.447 kg of 33.5 wt % styrene in hexane, and 2.785 kg of 21.5 wt % butadiene in hexane. The reactor was charged 4.1 ml of n-BuLi (1.6 M) in hexane, followed 1.20 ml of 2,2-bis(2'-tetrahydrofuryl)propane (1.6 M in hexane), and the reactor jacket was then heated to 50° C. After 32 minutes, the batch temperature peaked at 64° C. After an additional 30 minutes, the polymer cement was dropped into i-PrOH containing butylated hydroxytoluene (BHT), and drum dried. The polymers show the following properties.

TABLE 1

| Sample | Functional Group | Mn | Mw | Mp | MWD | % Coupling | Tg (° C.) |
|---|---|---|---|---|---|---|---|
| 1 | N/A | 106558 | 110290 | 111909 | 1.035 | 0.45 | −40.21 |
| 2 | N/A | 112409 | 118107 | 120237 | 1.051 | 1.57 | −35.66 |
| 3 | DMI | 57312 | 90301 | 120610 | 1.576 | 55.62 | −35.22 |
| 4 | SiN | 78626 | 130220 | 121472 | 1.656 | 34.97 | −34.73 |
| 5 | DMBATTEOS | 112140 | 154119 | 152935 | 1.374 | 10.99 | −39.54 |
| 6 | Di(OH)BA | 119004 | 154835 | 151999 | 1.311 | 7.88 | −39.34 |

Examples 2-4

To two gallons $N_2$ purged reactor equipped with a stirrer was added 1.708 kg of hexane, 0.447 kg of 33.5 wt % styrene in hexane, and 2.785 kg of 21.5 wt % butadiene in hexane. To a 8 oz $N_2$ purged oven dried bottle, 6 ml of 4,4'-trimethylene-dipiperidine (TMDP, 1.0 M in toluene), and 6 g of 21.5% butadiene in hexane was added, followed 7.8 ml of n-BuLi (1.6 M in hexane) and 2.1 ml of 2,2-bis(2'-tetrahydrofuryl)propane (1.6 M in hexane) at room temperature for 5 to 10 minutes. The resulting yellow solution was charged to the reactor and the reactor jacket was heated to 50° C. After 28 minutes, the batch temperature peaked at 68.2° C. After 30 minutes, the living cement was dropped into dried 28-oz glass bottles. The living cement was reacted with 1,3-dimethyl-2-imidazolidinone (DMI, 1.0M in toluene), N-n-butyl-aza-2,2-dimethoxysila-cyclopentane (SiN, 95%, 4.6M) and i-PrOH, respectively, at 50° C. water bath for 30 minutes. The polymer cements were dropped into i-PrOH containing butylated hydroxytoluene (BHT), and drum dried. The polymers were characterized by the properties set forth in Table 1.

Example 5-6

To two gallons $N_2$ purged reactor equipped with a stirrer was added 1.708 kg of hexane, 0.447 kg of 33.5 wt % styrene in hexane, and 2.785 kg of 21.5 wt % butadiene in hexane. To a 8 oz $N_2$ purged oven dried bottle, 6 ml of 4,4'-trimethylene-dipiperidine (TMDP, 1.0 M in toluene), and 6 g of 21.5% butadiene in hexane was added, followed 7.8 ml of n-BuLi (1.6M in hexane) and 1.8 ml of 2,2-bis(2'-tetrahydrofuryl)propane (1.6 M in hexane) at room temperature for 5 to 10 minutes. The resulting yellow solution was charged to the reactor and the reactor jacket was heated to 50° C. After 30 minutes, the batch temperature peaked at 70.9° C. After additional 30 minutes, the living cement was dropped into dried 28-oz glass bottles. The living cement was reacted with 3-(1,3-dimethylbutylidene)aminopropyl-triethoxysilane (3.0 M) DMBATTEOS, and 3,4-di(tert-butyldimethylsiloxy)benzaldehyde [Di(OH)BA, 1.0M in hexane] respectively, at 50° C. water bath for 30 minutes. The amount of DMBATTEOS and DI(OH)BA employed was sufficient to achieve a 1:1 molar ratio with the lithium. To the Di(OH)BA terminated polymer, a solution of tetrabutylammonium fluoride (TBAF, 1M solution in THF containing ca. 5% water, by controlling TBAF:TBDMSO=1.1:1) was added and agitated at room temperature for 1 hr. The polymer cements were dropped into i-PrOH containing butylated hydroxytoluene (BHT), and drum dried. The polymers show the properties listed in Table 1.

Rubber Vulcanizates

The SBR polymers prepared according to Examples 1-6 were utilized to prepare a vulcanizable elastomer that contained carbon black or silica as the reinforcing filler according to the formulations shown in Tables 2 and 3. The physical testing results are listed in Tables 4 and 5. Specifically, Table 4 provides data for vulcanizates prepared according to the recipe in Table 2, and Table 5 provides data for vulcanizates prepared according to the recipe in Table 3.

TABLE 2

| All CB Formulation | |
|---|---|
| Masterbatch | Amount (phr) |
| Polymer | 100 |
| CB | 50 |
| Wax | 2 |
| Oil | 0.1 |
| Stearic acid | 2 |
| Cure Retarder | 0.95 |
| Final | |
| Sulfur | 1.5 |
| Cure Accelerators | 1.3 |
| ZnO | 2.5 |
| Final total | 170.25 |

TABLE 3

All Silica Formulation

| Masterbatch | Amount (phr) |
|---|---|
| Polymer | 80 |
| Silica | 52.5 |
| NR | 20 |
| Wax | 2 |
| Oil | 0.1 |
| Stearic acid | 2 |
| Cure Retarder | 0.95 |
| Re-mill | |
| Silica | 2.5 |
| Silane | 5 |
| Final | |
| Sulfur | 1.5 |
| Cure Accelerators | 4.1 |
| Final total | 183.05 |

The respective vulcanizable formulations were fabricated into uncured test specimens and cured using conventional practices. The various test specimens were analyzed for various mechanical and dynamic properties. Specifically, the Mooney viscosity ($ML_{1+4}$) of the uncured rubber compound was determined at 130° C. by using a Alpha Technologies Mooney viscometer with a large rotor, a one-minute warm-up time, and a four-minute running time. The tensile mechanical properties (modulus, $T_b$, and $E_b$) of the vulcanizates were measured by using the standard procedure described in ASTM-D412. The Payne effect data ($\Delta G'$) and hysteresis data (tan δ) of the vulcanizates were obtained from a dynamic strain-sweep experiment, which was conducted at 50° C. and 15 Hz with strain sweeping from 0.1% to 20%. $\Delta G'$ is the difference between G' at 0.1% strain and G' at 20% strain. The physical properties of the vulcanizates are summarized in Table 4.

Bound rubber, a measure of the percentage of rubber bound, through some interaction, to the filler, was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula:

$$\% \text{ bound rubber} = (100(W_d - F))/R$$

where $W_d$ is the weight of the dried residue, F is the weight of the filler and any other solvent insoluble matter in the original sample, and R is the weight of the rubber in the original sample.

TABLE 4

Compound results in all carbon black formulation.
Formulation: All CB

| Samples | 1 | 2 | 3 | 4 | 5 | 6 |
|---|---|---|---|---|---|---|
| Head Functional Group | N/A | TMDP | TMDP | TMDP | TMDP | TMDP |
| Tail Functional Group | N/A | N/A | DMI | SiN | Di(OH)BA | DMBATTEOS |
| ML (kg · cm): | 0.75 | 0.87 | 0.92 | 1.63 | 4.21 | 2.06 |
| MH (kg · cm): | 16.56 | 17.48 | 15.34 | 14.63 | 17.72 | 17.86 |
| MH-ML (kg · cm): | 15.81 | 16.61 | 14.42 | 13.00 | 13.51 | 15.80 |
| t90 (min) | 6.50 | 8.27 | 7.75 | 5.81 | 6.23 | 8.85 |
| MICRO DUMBELL TENSILE (100° C., FINAL, UNAGED) | | | | | | |
| Eb | 236 | 218 | 213 | 190 | 212 | 198 |
| Tb | 7.80 | 7.60 | 8.30 | 7.10 | 10.10 | 8.30 |
| M200 | 6.31 | 6.82 | 7.71 | 7.83 | 9.37 | 8.24 |
| M50 | 1.42 | 1.49 | 1.40 | 1.38 | 1.74 | 1.58 |
| MICRO DUMBELL TENSILE (23° C., FINAL, UNAGED) | | | | | | |
| Eb | 373 | 317 | 336 | 366 | 332 | 315 |
| Tb | 16.10 | 14.30 | 17.50 | 18.80 | 18.80 | 17.80 |
| M300 | 12.39 | 13.39 | 15.12 | 14.78 | 16.83 | 16.65 |
| M50 | 1.83 | 1.90 | 1.63 | 1.57 | 1.88 | 1.82 |
| MOONEY (130° C., FINAL) | | | | | | |
| ML1 + 4 (MU)) | 18.2 | 21.4 | 31.4 | 44.5 | 89.7 | 71.1 |
| STRAIN SWEEP (60° C., FINAL, ARES HT) | | | | | | |
| G' (Mpa) @ 5%, 10 Hz: | 2.8532 | 2.9178 | 2.0311 | 2.1122 | 2.4784 | 2.1286 |
| G" (Mpa) @ 5%, 10 Hz: | 0.6678 | 0.6819 | 0.2473 | 0.2968 | 0.3506 | 0.2397 |
| tand @ 5%, 10 Hz: | 0.2341 | 0.2337 | 0.1218 | 0.1405 | 0.1415 | 0.1126 |
| ΔG' (Mpa) [0.25-14%], 10 Hz: | 3.8243 | 3.9109 | 0.6384 | 0.8252 | 1.4771 | 0.7768 |
| TEMPERATURE SWEEP (FINAL, RDAII A) | | | | | | |
| G' (Mpa) @ 0° C., 2%, 10 Hz: | 17.8000 | 18.8000 | 12.0000 | 10.9000 | 9.8351 | 14.7000 |
| G" (Mpa) @ 0° C., 2%, 10 Hz: | 6.7000 | 8.2300 | 5.5500 | 5.1600 | 3.7827 | 8.1800 |
| tanδ @ 0° C., 2%, 10 Hz: | 0.3774 | 0.4368 | 0.4621 | 0.4723 | 0.3846 | 0.5549 |
| G' (Mpa) @ 60° C., 2%, 10 Hz: | 6.8300 | 6.4200 | 4.5400 | 4.0300 | 4.2674 | 4.8900 |
| G" (Mpa) @ 60° C., 2%, 10 Hz: | 1.4600 | 1.3700 | 0.6220 | 0.5750 | 0.6128 | 0.6410 |
| tand @ 60° C., 2%, 10 Hz: | 0.2144 | 0.2130 | 0.1371 | 0.1429 | 0.1436 | 0.1312 |
| DYNASTAT (60° C., FINAL) | | | | | | |
| K' (lbf/in) | 236.1109 | 238.5419 | 158.0291 | 163.4406 | 184.6720 | 177.6888 |
| K" (lbf/in) | 51.3170 | 50.6874 | 18.3066 | 21.8839 | 25.1760 | 19.6937 |

TABLE 4-continued

Compound results in all carbon black formulation.
Formulation: All CB

| Samples | 1 | 2 | 3 | 4 | 5 | 6 |
|---|---|---|---|---|---|---|
| tand | 0.2173 | 0.2125 | 0.1158 | 0.1339 | 0.1363 | 0.1108 |
| Bound Rubber (%) | 9.5 | 13.4 | 32.0 | 36.1 | 50.4 | 35.8 |
| Peak tand @ 2%, 10 Hz | 0.7241 | 0.7699 | 0.9006 | 0.9543 | 0.9087 | 0.9131 |

TABLE 5

Compound results in all silica formulation.
Formulation: All SiO$_2$

| Samples | 1 | 2 | 3 | 4 | 5 | 6 |
|---|---|---|---|---|---|---|
| Head Functional Group | N/A | TMDP | TMDP | TMDP | TMDP | TMDP |
| Tail Functional Group | N/A | N/A | DMI | SiN | Di(OH)BA | DMBATTEOS |
| MDR2000 (171° C., FINAL) | | | | | | |
| ML (kg · cm): | 1.71 | 1.66 | 1.74 | 2.61 | 4.21 | 2.53 |
| MH (kg · cm): | 23.46 | 22.91 | 22.04 | 20.21 | 21.75 | 22.32 |
| MH-ML (kg · cm): | 21.75 | 21.25 | 20.30 | 17.60 | 17.54 | 19.79 |
| t90 (min) | 8.09 | 7.67 | 6.87 | 7.61 | 5.05 | 4.82 |
| MICRO DUMBELL TENSILE (100° C., FINAL, UNAGED) | | | | | | |
| Eb | 214 | 210 | 179 | 182 | 169 | 186 |
| Tb | 7.30 | 7.20 | 6.70 | 6.80 | 6.7 | 7.20 |
| M100 | 3.19 | 3.21 | 3.64 | 3.38 | 3.77 | 3.49 |
| M50 | 1.78 | 1.77 | 1.95 | 1.75 | 2.01 | 1.85 |
| MICRO DUMBELL TENSILE (23° C., FINAL, UNAGED) | | | | | | |
| Eb | 298 | 301 | 296 | 277 | 268 | 291 |
| Tb | 12.60 | 13.10 | 13.80 | 12.90 | 13.2 | 14.50 |
| M200 | 7.61 | 7.79 | 8.35 | 8.16 | 8.62 | 8.65 |
| M50 | 2.02 | 1.99 | 2.06 | 1.81 | 1.93 | 1.90 |
| MOONEY (130° C., FINAL) | | | | | | |
| ML1 + 4 (MU)) | 15.5 | 17.9 | 33.2 | 42.8 | 67.1 | 53.9 |
| STRAIN SWEEP (60° C., FINAL, ARESHT) | | | | | | |
| G' (Mpa) @ 5%, 10 Hz: | 4.3050 | 3.7492 | 3.0572 | 2.9522 | 3.0339 | 2.8406 |
| G" (Mpa) @ 5%, 10 Hz: | 0.6925 | 0.6184 | 0.3109 | 0.2749 | 0.2644 | 0.2737 |
| tand @ 5%, 10 Hz: | 0.1609 | 0.1650 | 0.1017 | 0.0931 | 0.0871 | 0.0964 |
| ΔG' (Mpa) [0.25-14%], 10 Hz: | 4.9069 | 4.4455 | 1.5888 | 1.2587 | 1.4724 | 1.6102 |
| TEMPERATURE SWEEP (FINAL, RDAII A) | | | | | | |
| G' (Mpa) @ 0° C., 2%, 10 Hz: | 13.8823 | 13.3074 | 13.1181 | 7.4666 | 6.8546 | 13.3904 |
| G" (Mpa) @ 0° C., 2%, 10 Hz: | 3.9176 | 4.3064 | 4.4335 | 2.7910 | 2.7860 | 5.3667 |
| tand @ 0° C., 2%, 10 Hz: | 0.2806 | 0.3210 | 0.3346 | 0.3684 | 0.4062 | 0.3953 |
| G' (Mpa) @ 60° C., 2%, 10 Hz: | 7.3439 | 6.5027 | 6.4908 | 3.6865 | 3.7377 | 5.9975 |
| G" (Mpa) @ 60° C., 2%, 10 Hz: | 1.0288 | 0.8590 | 0.7028 | 0.2985 | 0.2688 | 0.5996 |
| tand @ 60° C., 2%, 10 Hz: | 0.1401 | 0.1321 | 0.1083 | 0.0809 | 0.0719 | 0.0999 |
| DYNASTAT (60° C., FINAL) | | | | | | |
| K' (lbf/in) | 433.1526 | 335.1273 | 226.7737 | 234.0042 | 224.4144 | 225.6935 |
| K" (lbf/in) | 54.1229 | 45.3520 | 18.9355 | 18.6867 | 16.4772 | 17.4146 |
| tand | 0.1250 | 0.1353 | 0.0835 | 0.0798 | 0.0734 | 0.0772 |
| Bound Rubber (%) | 20.5 | 20.4 | 20.9 | 64.0 | 76.4 | 37.5 |
| Peak tand @ 2%, 10 Hz | 0.7403 | 0.7710 | 0.7814 | 0.9102 | 0.9420 | 0.7824 |

Various modifications and alterations that do not depart from the scope and spirit of this invention will become apparent to those skilled in the art. This invention is not to be duly limited to the illustrative embodiments set forth herein.

What is claimed is:

1. A stabilized initiator solution comprising:
   i. a chain-extended initiator defined by the Formula I

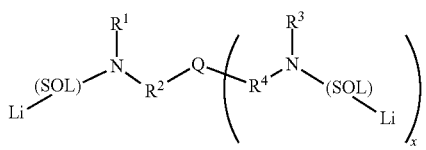

where each SOL is independently a divalent solubilizing component including from 3 to about 300 mer units, x is an integer of 1 or more, Q is (a) an element selected form the group consisting of O, S, N, P, and Si or (b) a multivalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group, or a chain-extended initiator defined by the Formula VI

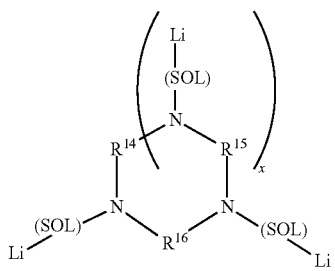

where each SOL is independently a divalent solubilizing component including from 3 to about 300 mer units, x is an integer of 1 or more, and $R^{14}$, $R^{15}$, and $R^{16}$ are each independently a divalent organic group; and
   ii. an aliphatic solvent, cycloaliphatic solvent, or a mixture thereof.

2. The stabilized initiator solution of claim 1, where the stabilized initiator solution includes at least 0.01 moles of chain-extended initiator per liter of solvent.

3. The stabilized initiator solution of claim 1, where the chain-extended initiator is defined by the formula II:

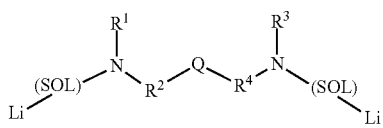

where each SOL is independently a divalent solubilizing component including from 3 to about 300 mer units, Q is (a) an element selected form the group consisting of O, S, N, P, and Si or (b) a divalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group.

4. The stabilized initiator solution of claim 1, where the chain-extended initiator is defined by the formula III:

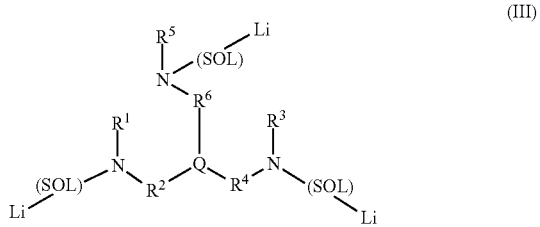

where each SOL is independently a divalent solubilizing component including from 3 to about 300 mer units, Q is (a) an element selected form the group consisting of N, P, and Si or (b) a trivalent organic group, and $R^1$, $R^2$, $R^3$, $R^4$, $R^5$ and $R^6$ are each independently a monovalent organic group, or where $R^1$ joins with $R^2$ to form a trivalent organic group, and/or $R^3$ joins with $R^4$ to form a trivalent organic group, and/or $R^5$ joins with $R^6$ to form a trivalent organic group.

5. The stabilized initiator solution of claim 1, where the chain-extended initiator is defined by the formula IV:

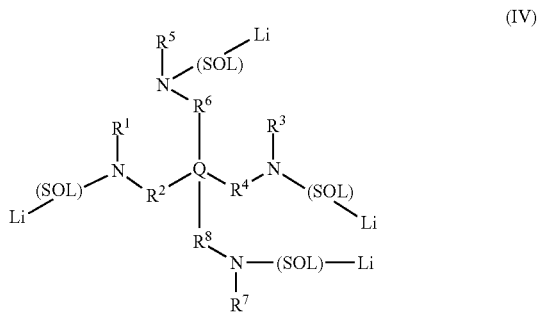

where each SOL is independently a divalent solubilizing component including from 3 to about 300 mer units, Q is a silicon or a tetravalent organic group, and $R^1$, $R^2$, $R^3$, $R^4$, $R^5$, $R^6$, $R^7$, and $R^8$ are each independently a monovalent organic group, or where $R^1$ joins with $R^2$ to form a trivalent organic group, and/or $R^3$ joins with $R^4$ to form a trivalent organic group, and/or $R^5$ joins with $R^6$ to form a trivalent organic group, and/or $R^7$ joins with $R^8$ to form a trivalent organic group.

6. The stabilized initiator solution of claim 1, where the chain-extended initiator is defined by the formula V:

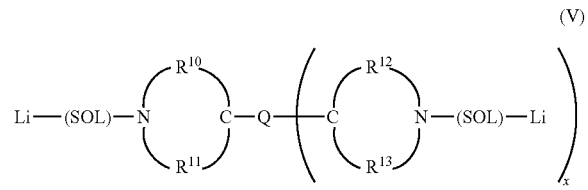

where each SOL is independently a divalent solubilizing component including from 3 to about 300 mer units, x is an integer of 1 or more, Q is (a) an element selected form the group consisting of O, S, N, P, and Si or (b) a multivalent organic group, and $R^{10}$, $R^{11}$, $R^{12}$, and $R^{13}$ are each independently a divalent organic group.

7. The stabilized initiator solution of claim 1, where the chain-extended initiator is defined by the formula VI:

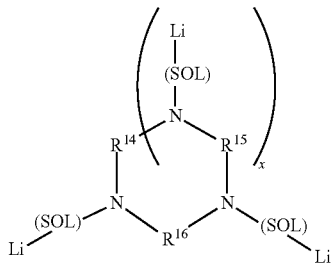

(VI)

where each SOL is independently a divalent solubilizing component including from 3 to about 300 mer units, x is an integer of 1 or more, and $R^{14}$, $R^{15}$, and $R^{16}$ are each independently a divalent organic group.

8. The stabilized initiator solution of claim 1, where the chain-extended initiator is dissolved in the aliphatic and/or cycloaliphatic solvent.

9. A method for continuously manufacturing polydienes or polydiene copolymers, the method comprising:
   i. continuously charging conjugated diene monomer, optionally together with monomer copolymerizable therewith, to a continuously-stirred reactor; and
   ii. continuously charging a stabilized solution of a chain-extended initiator to the continuously-stirred reactor, where the solution includes a chain-extended initiator defined by the Formula I

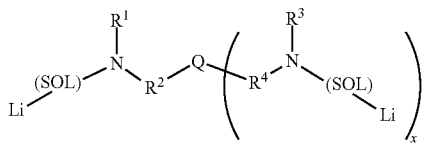

(I)

where each SOL is independently a divalent solubilizing component including from 3 to about 300 mer units, x is an integer of 1 or more, Q is (a) an element selected form the group consisting of O, S, N, P, and Si or (b) a multivalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group, or a chain-extended initiator defined by the Formula VI

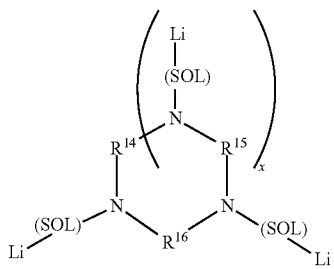

(VI)

where each SOL is independently a divalent solubilizing component including from 3 to about 300 mer units, x is an integer of 1 or more, and $R^{14}$, $R^{15}$, and $R^{16}$ are each independently a divalent organic group, and an aliphatic solvent, cycloaliphatic solvent, or a mixture thereof.

10. The method of claim 9, further comprising the step of continuously charging a functionalizing agent to the reactor to thereby form a telechelic polymer.

11. The method of claim 9, where the stabilized initiator solution includes at least 0.01 moles of chain-extended initiator per liter of solvent.

12. The composition method of claim 11, where the chain-extended initiator is defined by the formula II:

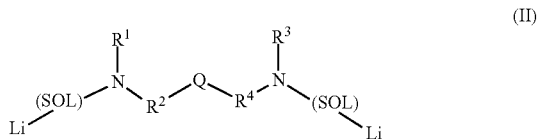

(II)

where each SOL is independently a divalent solubilizing component including from 3 to about 300 mer units, Q is (a) an element selected form the group consisting of O, S, N, P, and Si or (b) a divalent organic group, and $R^1$, $R^2$, $R^3$, and $R^4$ are each independently a monovalent organic group, or where $R^1$ joins with $R^2$ to form a trivalent organic group, and/or $R^3$ joins with $R^4$ to form a trivalent organic group.

13. The method of claim 9, where the chain-extended initiator is defined by the formula III:

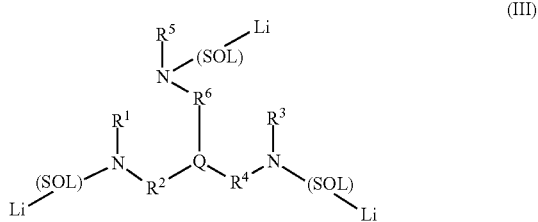

(III)

where each SOL is independently a divalent solubilizing component including from 3 to about 300 mer units, Q is (a) an element selected form the group consisting of N, P, and Si or (b) a trivalent organic group, and $R^1$, $R^2$, $R^3$, $R^4$, $R^5$ and $R^6$ are each independently a monovalent organic group, or where $R^1$ joins with $R^2$ to form a trivalent organic group, and/or $R^3$ joins with $R^4$ to form a trivalent organic group, and/or $R^5$ joins with $R^6$ to form a trivalent organic group.

14. The method of claim 11, where the chain-extended initiator is defined by the formula IV:

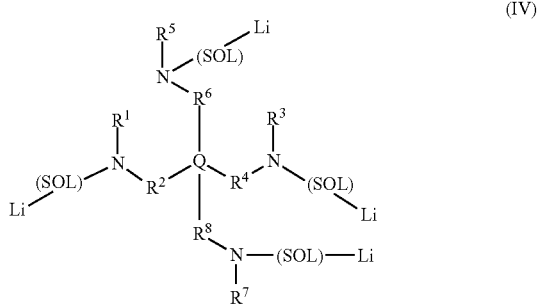

(IV)

where each SOL is independently a divalent solubilizing component including from 3 to about 300 mer units, Q is a silicon or a tetravalent organic group, and $R^1$, $R^2$, $R^3$, $R^4$, $R^5$, $R^6$, $R^7$, and $R^8$ are each independently a monovalent organic group, or where $R^1$ joins with $R^2$ to form a trivalent organic group, and/or $R^3$ joins with $R^4$ to form a trivalent organic group, and/or $R^5$ joins with $R^6$ to form a trivalent organic group, and/or $R^7$ joins with $R^8$ to form a trivalent organic group.

15. The method of claim 9, where the chain-extended initiator is defined by the formula V:

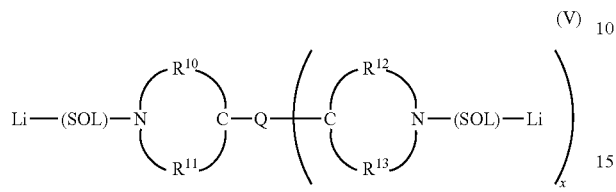

where each SOL is independently a divalent solubilizing component including from 3 to about 300 mer units, x is an integer of 1 or more, Q is (a) an element selected form the group consisting of O, S, N, P, and Si or (b) a multivalent organic group, and $R^{10}$, $R^{11}$, $R^{12}$, and $R^{13}$ are each independently a divalent organic group.

16. The method of claim 9, where the chain-extended initiator is defined by the formula VI:

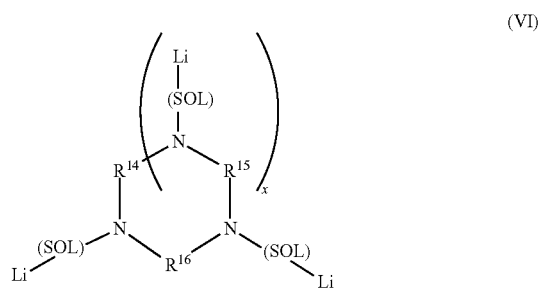

where each SOL is independently a divalent solubilizing component including from 3 to about 300 mer units, x is an integer of 1 or more, and $R^{14}$, $R^{15}$, and $R^{16}$ are each independently a divalent organic group.

17. The method of claim 9, where the solvent is an aliphatic solvent.

18. The method of claim 9, where the chain-extended initiator is dissolved in the aliphatic and/or cycloaliphatic solvent.

19. A method for continuously manufacturing polydienes or polydiene copolymers, the method comprising:
   i. continuously charging conjugated diene monomer, optionally together with monomer copolymerizable therewith, to a reactor; and
   ii. continuously charging a stabilized solution of a chain-extended initiator of claim 1 to the reactor, where the solution of a chain-extended initiator is prepared by first preparing a blend that includes a polyamine and conjugated diene monomer, and then subsequently introducing an organolithium compound to the blend to thereby form the chain-extended initiator within the solution, where the solution of a chain-extended initiator is prepared outside of said reactor.

20. The method of claim 19, where the polyamine is selected from the group consisting of 4'-trimethylenedipiperidine, N,N'-diethyl-1,3-propane diamine, N,N'-diisopropyl-1,3-propanediamine, N,N-diethyl-2-butene-1,4-diamine, tris[2-(methylamino)ethyl]amine, tris[2-(isopropylamino)ethyl]amine, 1,5,9-triazacyclododecane, 1,4,7,10-tetraazacyclododecane, 1,4,8,11-tetraazacyclotetradecane, 1,4,8,12-tetraazacyclopentadecane, and 1,4,7,10,13,16-hexaazacyclooctadecane.

21. The method of claim 9, wherein the stabilized solution of a chain-extended initiator is prepared in a vessel that is separate from said continuously-stirred reactor.

* * * * *